United States Patent [19]

Assouline

[11] 4,269,008

[45] May 26, 1981

[54] DEVICE TO KEEP BIRDS FROM ALIGHTING ON BUILDINGS

[76] Inventor: David Assouline, 103 Ave. Philippe Auguste, 75011 Paris, France

[21] Appl. No.: 95,442

[22] Filed: Nov. 19, 1979

[30] Foreign Application Priority Data

Nov. 20, 1978 [FR] France ................................ 78 32679

[51] Int. Cl.³ .............................................. E04B 1/72
[52] U.S. Cl. ...................................... 52/101; 52/517; 52/DIG. 10
[58] Field of Search ........... 52/101, 24, 517, DIG. 10, 52/173

[56] References Cited

U.S. PATENT DOCUMENTS

| | | |
|---|---|---|
| 2,270,537 | 1/1942 | Ludington ........................ 52/24 X |
| 2,938,243 | 5/1960 | Peles ................................... 52/101 |
| 3,133,321 | 5/1964 | Hine .................................... 52/101 |
| 3,282,000 | 11/1966 | Shaw et al. ......................... 52/101 |
| 3,359,657 | 12/1967 | Hedberg ....................... 52/DIG. 10 |
| 3,407,550 | 10/1968 | Shaw ................................... 52/101 |
| 3,617,691 | 11/1971 | Toyooka et al. ...................... 52/24 |
| 3,658,413 | 4/1972 | Cornell ......................... 52/DIG. 10 |
| 3,834,789 | 9/1974 | Brudy ........................... 52/DIG. 10 |
| 4,141,182 | 2/1979 | McMullen ............................. 52/24 |

Primary Examiner—J. Karl Bell
Attorney, Agent, or Firm—Browdy & Neimark

[57] ABSTRACT

A device to repel birds from nesting on buildings and the like includes a series of closely spaced, upwardly extending structures surmounted with pyramids, the angles of which are such that a prism effect is created which serves to optically frighten the birds.

6 Claims, 4 Drawing Figures

DEVICE TO KEEP BIRDS FROM ALIGHTING ON BUILDINGS

FIELD OF INVENTION

This invention relates to repelling birds, such as pigeons and starlings, and relates more particularly to a device to drive away birds and prevent them from alighting and nesting on roofs, cornices of buildings or parts of constructions such as window ledges or the like.

BACKGROUND OF INVENTION

The dangers and costs involved by the presence of a very large number of birds, particularly domestic pigeons, in large centers of population, are known. Besides diseases, particular viral diseases, transmitted to man by air, domestic pigeons and starlings cause serious defacement of buildings, vehicles, roads, etc. by their droppings. Further, the cries and clucking of these birds considerably disturb the tranquillity of the citizens.

To mitigate these drawbacks, various types of processes or systems have been marketed or designed.

According to a first group of techniques, an effort is made to drive off the pigeons by placing a repulsive product, of the bird lime type, on all projections frequented by the birds. This process has numerous drawbacks inherent both in the product used (melting and running in hot weather, freezing in cold weather, attraction of dust and pollutants, short life) and in the difficulties and danger for workers and service personnel in applying it.

According to another group of systems, it has been proposed to place, on all the elements usually frequented by the birds, various devices intended to prevent them from alighting on the latter, such as, for example: inclined planes or strips of triangular shape with the point upward, folded like an accordion; triangular vertical plates brought close together, with sharp points, in the same plane or divergent; supports provided with pointed plastic teeth; sharp wires; etc. While such systems may be effective, at least in some cases, in causing the birds to lose their balance, they are not a panacea; actually, experience shows that birds apparently are not frightened by such devices with sharp points and avoid the difficulty by alighting in the immediate vicinity.

SUMMARY OF INVENTION

It is, accordingly, an object of the invention to overcome deficiencies in the prior art, such as those indicated above; it is another object to repell birds from buildings; it is a further object to provide improved means for repelling birds from buildings. Other objects and the nature and advantages of the invention will be apparent from the description below.

It has now been found, after numerous series of systematic tests, that to remove pigeons and other birds totally and finally from buildings, public edifices and other constructions, it does not suffice to provide the placement of "antiperch" devices, but it is further necessary to find a means making it possible to frighten the birds at a distance.

To achieve this aim, so far not contemplated in the prior state of the known art, and to solve the double problem mentioned above, the invention proposes a physical or mechanical means of modular type elements, with vertical volumes narrowing upward, the placement of which is rapid and easy on all surfaces frequented by birds and which hold up well under aging and weather. The device according to the invention is essentially characterized in that each modular element is made up of a polyhedron with transparent lateral faces able to impart a prism effect and which come together at the top in the form of a sharp point.

Thus, in contrast with strips, points, pointed rod or other systems devised so far, the new device performs the desired double function of preventing birds from alighting and having a deterrent effect on them thanks to the optical phenomenon, particularly by refraction, caused by the orientation of the faces and the transparent material used for making the polyhedra or the unit of the device.

According to a preferred embodiment, the lateral faces coming together at the top of each polyhedron form an angle less than 90° in relation to the horizontal and the distance between the closest parts of two bases of adjacent polyhedra on the base support is advantageously less than or equal to 3 centimeters.

In practice, the volume of polyhedron can be solid or hollow and its shape can be varied provided that the conditions relating to angles, distances and pointed tops, as summarized above, are respected. By way of non-limiting example, the polyhedron can be a polygon or any quadrilateral (for example, of the rectangular type) surmounted by a pyramid.

BRIEF DESCRIPTION OF DRAWING

Still other characteristics will be brought out during the following description which relates to non-limiting embodiments shown by the accompanying drawings wherein.

DETAILED DESCRIPTION OF EMBODIMENTS

Figure 1:
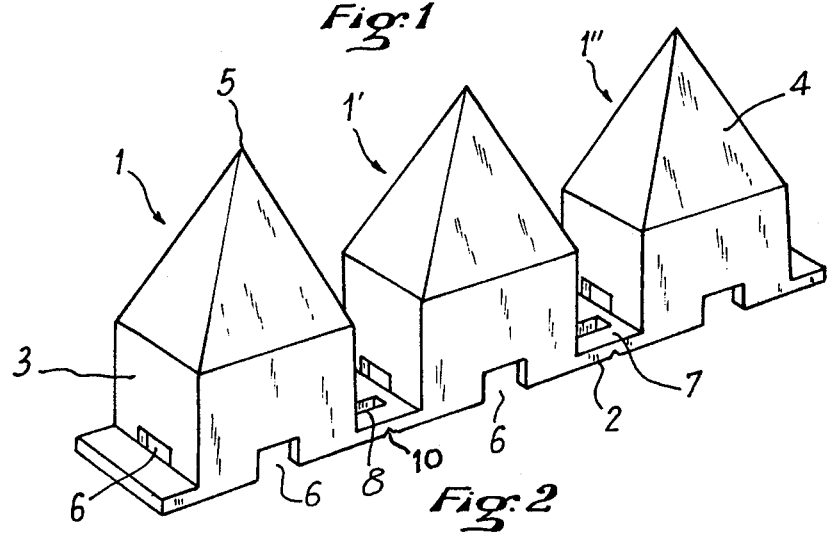
FIG. 1 is a perspective of the adjacent polyhedral elements on a support base, according to the invention.
Figure 2:
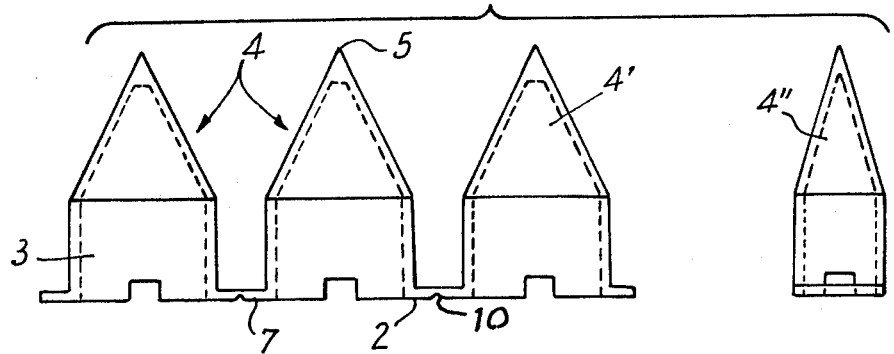
FIG. 2 is a first elevation of two types of faces of the upper part of a polyhedron according to FIG. 1.

In the examples shown in the figures, the device is made up of a series of polyhedral modular elements 1, 1', 1" placed on support base 2, at a distance from one another that is equal or variable. Each polyhedron has, in its lower part, the shape of a quadrilateral of the rectangular type 3 extended upward by a pyramid 4 whose two opposite large faces 4' and two opposite small faces 4Δ join at the summit in a sharp point 5. Preferably, as indicated in FIGS. 1 and 3, at least one face of the polyhedron, at the base of the latter, is provided with a recess 6 to assure demisting of the inside volume of each polyhedron when it is hollow.

Figure 3:
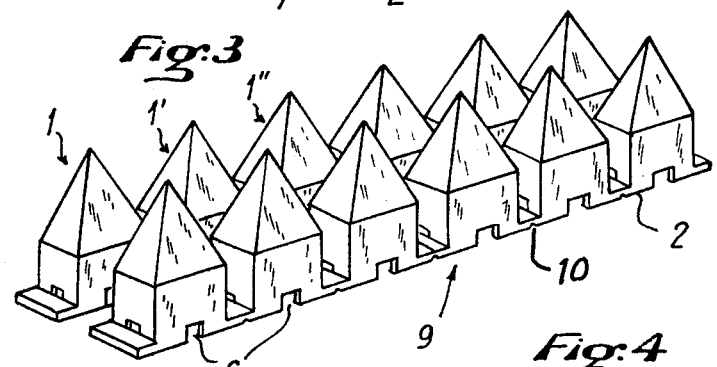
FIG. 3 shows in perspective two examples, ready to install, of a device according to FIG. 1.
Figure 4:
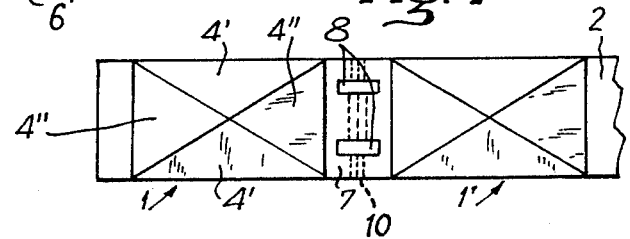
FIG. 4 is a top view, in projection on a horizontal plane, of a part of the unit of FIG. 1 or FIG. 3.

To make a single unit capable of being installed on a roof, cornice, window or other support, in one or more rows (for example, two as indicated in FIG. 3), the successive polyhedra are fitted on support base 2 which can be separate or an integral part of the polyhedra 1, 1', 1". In the example shown, the rectangular base of each polyhedron serves as the base support and two successive polyhedra are connected by bridge flanges 7, here molded from the same material as the unit of the device. These flanges can have therein perforations 8 in case it is desired to fasten a strip 9 of modular elements with screws, nails, clips, fastening straps or similar means. Such units can also be fixed by suitable cement or adhesive. The bridge flanges 7 may be suitably provided with grooves 10 to permit pre-molded modules to be broken into desired length during installation.

To be effective, both in the action of reflecting light rays and preventing pigeons or the like from alighting, it is recommended that there be used, for the edges of the polyhedral faces, angles less than 90° and that a distance less than 3 centimeters be provided between two bases of the polyhedra.

The material used can be of any nature provided it exhibits faces able to give a prism effect. There can be cited, for example, glass, metal or alloy, rigid or semirigid transparent plastic, such as polyvinyl chloride, impact polystyrene or equivalent. The transparent plastic is protected from ultraviolet rays such as by incorporation of known degradation inhibitors. The unit of polyhedra in a series and the support base can be molded in a single piece to reduce fabrication costs.

The invention, of course, is not limited to this illustrative embodiment and extends to numerous technical equivalents. For example, according to diverse variants, other types of volumes can be used for each polyhedron, for example, cone, double pyramid, polygon with a triangular summit, etc.; the polyhedra can be solid and not hollow and be slightly tinted, etc. or metalized to provide a mirror surface. Obviously, the device can be made in any size and one or more systems of setting the support base can be used, such as: glue, screws, mounting on a stationary support by a clamp or clip or over bridge flange 7.

Series of tests made with the prototypes described in the above example, in various urban sectors noted for being particularly invaded by pigeons, made it possible to show immediate and spectacular results; as soon as the device was installed, which is fast and easy, the pigeons deserted the sector thus protected, taking refuge outside the zone.

What is claimed is:

1. Device to drive away birds and prevent them from alighting and nesting on roofs, cornices and other surfaces of buildings, edifices, parts of constructions or the like, comprising a series of shaped elements extending vertically and each having a pointed summit, on a support base, each said shaped element comprising a polyhedron with transparent lateral faces, able to give a prism effect and which come together at the summit in the form of a sharp point.

2. Device according to claim 1 wherein the shape of the polyhedron is conical, pyramidal, polygon with a triangular summit, or quadrilateral surmounted by a pyramid.

3. Device according to claim 1 wherein the lateral faces coming together at the summit of each polyhedron make an angle less than 90° in relation to the horizontal and wherein the distance between the closest parts of two bases of adjacent polyhedra on the support base is less than or equal to 3 centimeters.

4. Device according to any one of claims 1 to 3 wherein notches or vents are provided in the lower part of each polyhedron.

5. Device according to any one of claims 1 to 3 wherein the support base is provided at the base of the polyhedra and which constitutes their support for fastening onto the surface to be protected, is an integral part of said base and is provided, between two successive polyhedra with perforations for passage of fastening means.

6. Device according to any one of claims 1 to 3 wherein the polyhedra, and possibly the support base when it is solid with these latter, are made of various materials selected particularly from the group consisting of glass, metal or alloy, and semirigid or rigid transparent plastic protected from ultraviolet rays.

* * * * *